United States Patent [19]

Ichinokawa et al.

[11] Patent Number: 4,581,761
[45] Date of Patent: Apr. 8, 1986

[54] MANUAL IMAGE SCANNING SYSTEM

[75] Inventors: Kazuo Ichinokawa; Yoichi Sato; Tadashi Ohtsuka, all of Tokyo, Japan

[73] Assignee: NEC Corporation, Tokyo, Japan

[21] Appl. No.: 736,274

[22] Filed: May 20, 1985

[30] Foreign Application Priority Data

May 22, 1984 [JP] Japan .................. 59-102897

[51] Int. Cl.⁴ ............................. G06K 9/22
[52] U.S. Cl. ........................ 382/13; 382/59; 178/18; 178/19
[58] Field of Search ............... 382/3, 13, 59; 178/18, 178/19

[56] References Cited

U.S. PATENT DOCUMENTS 4,260,979  4/1981  Smith ............................ 382/59
4,298,772  11/1981  Kobayashi et al. ............... 178/18

Primary Examiner—Leo H. Boudreau
Assistant Examiner—Jacqueline Todd
Attorney, Agent, or Firm—Laff, Whitesel, Conte & Saret

[57] ABSTRACT

A manual image scanning system is operative to read image data of figures or letters depicted on a sheet of paper based on manual operation to input them to a personal computer for data processing. The manual image scanning system comprises a data tablet or a digitizer in which magnetostriction pulses propagate, the data tablet being adapted so that a sheet of paper on which a figure is drawn is placed thereon, and a compact manual image scanner adapted to be manually movably placed on the data tablet, the manual image scanner having a first function to recognize the figure drawn on the paper to produce data indicative of image of the figure, and a second function to sense a position of the scanner to produce data indicative of the position of the scanner. The scanning system further comprises high speed image processing circuitry responsive to the image data and the position data from the scanner to compute coordinates of the scanner on the data tablet, thereby recognizing which portion of the data tablet the image data corresponds to. Thus, this system can sufficiently exhibit features provided by the data tablet and the optical figure recognition device.

13 Claims, 7 Drawing Figures

MANUAL IMAGE SCANNING SYSTEM

BACKGROUND OF THE INVENTION

The present invention relates to a system for reading image data in respect of figures or letters depicted on an ordinary paper based on manual operation to input them to a data processing device e.g. a personal computer etc.

Hitherto, there has been already proposed a device in which an image sensor is slidden along a straight line by using a mechanical means to read an image pattern depicted on a paper. This device is a sort of facsimile adapted to automatically read the entire figures drawn on a sheet of paper. Such a conventional device requires a rail for sliding the image sensor and driving force supplying mechanics, resulting in high cost and large scale.

SUMMARY OF THE INVENTION

With the above in view, an object of this invention is to provide a manual image scanning system which can recognize figures or letters drawn on a sheet of paper, by allowing a compact manual image scanner to be traced on the sheet of paper along an arbitrary direction.

Another object of this invention is to provide a manual image scanning system which can sufficiently exhibit features provided by a digitizer or data tablet and an optical letter recognition device.

A further object of this invention is to provide a manual image scanning system which can recognize relative positional relationship between images obtained by a plurality of scannings of the manual image scanner, thus making it possible to read letters or figures which cannot be covered by a single scanning of the manual image scanner.

A still further object of the present invention is to facilitate alignment operation of a magnetization direction in the digitizer or data tablet.

According to the present invention, there is provided a manual image scanning system comprising: tablet means in which magnetostriction pulses propagate, the tablet means being adapted so as to place thereon a sheet of paper on which a figure is drawn; manual image scanner means adapted manually movably placed on the tablet means, the scanner means having a first function to recognize the figure drawn on the paper to produce data indicative of image of the figure, and a second function to sense a position of the scanner means to produce data indicative of the position of the scanner means; and image processor means responsive to the image data and the position data from the manual image scanner means to compute coordinates of the scanner means, thereby recognizing which portion of the tablet means the image data corresponds to.

The tablet means may comprise a magnetostriction metal plate in which a magnetostriction wave based on the magnetostriction phenomenon propagates, and a magnetic plate provided on one side of the magnetostriction metal plate, the magnetic plate being magnetized so as to allow the magnetostriction plate to be magnetized in a direction parallel to the plate surface thereof. The metal plate may be comprised of a nickel plate.

The manual image scanner means may comprise optical letter recognition means for performing the first function, and magnetic detection means for performing the second function. The manual image scanner means may be provided on the upper surface thereof with a plurality of function keys for allowing the processor means to effect predetermined image processings. The manual image scanner means may be provided on the back side thereof with a switch for a figure recognition operation, a pair of magnetic signal sensing coils, and a window opened through the bottom portion for reading the image of the letter drawn on the paper.

The optical letter recognition means includes an image sensing circuit, the magnetic detector means includes a magnetic signal sensing circuit, and the switch is coupled to a mode detection circuit.

The processor means may comprise a counter circuit, an infinitesimal signal detection circuit responsive to an output from the magnetic signal sensing circuit, a buffer memory circuit responsive to an output from the image sensing circuit, and a processing unit responsive to an output from the mode detection circuit and to an output from the buffer memory circuit, the processing unit being operative to provide a command to the image sensing circuit and to transmit image processing data to an external computer or receive it therefrom.

The manual image scanner means may further comprise a LED lamp array for irradiating light onto the paper, an optical lens system, a one-dimensional charge coupled sensor device, a height adjustment plate, and a binary coding circuit board.

The tablet means may further comprises two one-turn coils for generating magnetostriction pulses in X- and Y-axes, respectively, a magnetostriction pulse propagation system being constituted by the tablet means and means for applying high voltage impulses to the one-turn coils.

BRIEF DESCRIPTION OF THE DRAWINGS

The features and advantages of a manual image scanning system according to the present invention will become more apparent from the following description taken in conjunction with the accompanying drawings in which.

DETAILED DESCRIPTION OF THE PREFERRED EMBODIMENT

Initially, reference is made to an outline of a manual image scanner as a main tool employed in a manual image scanning system according to the present invention. This manual image scanner has so a small size that it can be accommodated in the palm of hand. By allowing the manual image scanner to be traced on a sheet of paper along an arbitrary direction, a figure dipicted on the traced portions can be read. Such a manual image reading system has such an excellent feature that figures or letters separately dipicted on several sheets of paper can be edited into one page, by which a wide application can be expected. Such a manual editing procedure enables human creative image processing. On the other hand, in order to precisely input at a high speed an image pattern which follows a freely changeable manual movement, the manual image reading system is required to provide high intelligent function.

Figure 1:
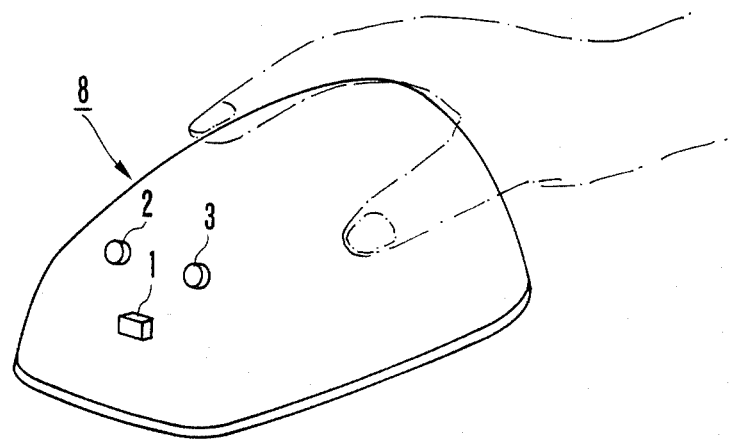
FIG. 1 is a perspective view illustrating an example of a manual image scanner employed in the present invention.
Figure 2:
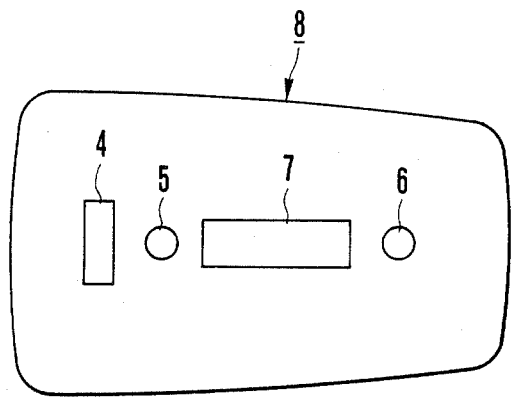
FIG. 2 shows a bottom view of the manual image scanner shown in FIG. 1.

The manual image scanning system according to the present invention comprise three parts. The first part is constituted by the above-mentioned manual image scanner as referred to as 8, which is formed as indicated in FIG. 1 and is provided on its surface with three functional keys 1, 2 and 3. FIG. 2 is a schematic view illustrating the back (i.e. the surface in contact with a sheet of paper to be read) of the manual image scanner. Three functional keys 1, 2 and 3 are required for effecting editing procedure, such as parallel translation of coordinates, enlargement or reduction of figures, or partial erasing of figures which have been inputted in advance. As shown in FIG. 2, the manual image scanner is provided on its back with a switch 4 to effect on/off operation for reading figures, a pair of magnetic signal sensing coils 5 and 6, and a window 7 for reading an image pattern therethrough by means of one dimensional charge coupled image sensor which will be described later. The second part is constituted by a means for sensing a position on the paper of the manual image sensor. For such a position sensing means, there may be employed a sensor called a "digitizer" or a "data tablet" commercially available in the art. In principle, most of such position sensors utilize changes in magnetic force. The present invention also employs, as its principle of position sensing, a magnetostriction system based on changes in magnetic force. The position sensing operation based on the magnetostriction system is as follows: First is to propagate a magnetostrictive pulse on a metal plate (e.g. nickel plate) having high permeability to sense a change in magnetic force on the metal plate by using the magnetic signal sensing coils 5 and 6. Next is to measure propagation time of the magnetostrictive pulse on the basis of the change in the magnetic force thus sensed, thereby computing position on the metal plate of the two magnetic signal sensing coils. In accordance with this system, when a sheet of paper on which figures are dipicted is placed on the metal plate and then the manual image scanner is placed thereon, computation of the central positions of the respective paired magnetic signal sensing coils is made. Thus, it is judged that the image pattern which has been read from the one-dimensional charge coupled image sensor device is located on a line connecting centers of the pair of magnetic signal sensing coils. The third part of the invention is constituted by a high speed image processing circuit operative to process the data indicative of position sensed by the pair of magnetic signal sensing coils and the data indicative of image pattern read by the one-dimensional charge coupled image sensor device so that a personal computer can draw the image pattern at a high speed and at an appropriate position on the screen of its monitor, and to output the processed data to the personal computer.

Figure 3:
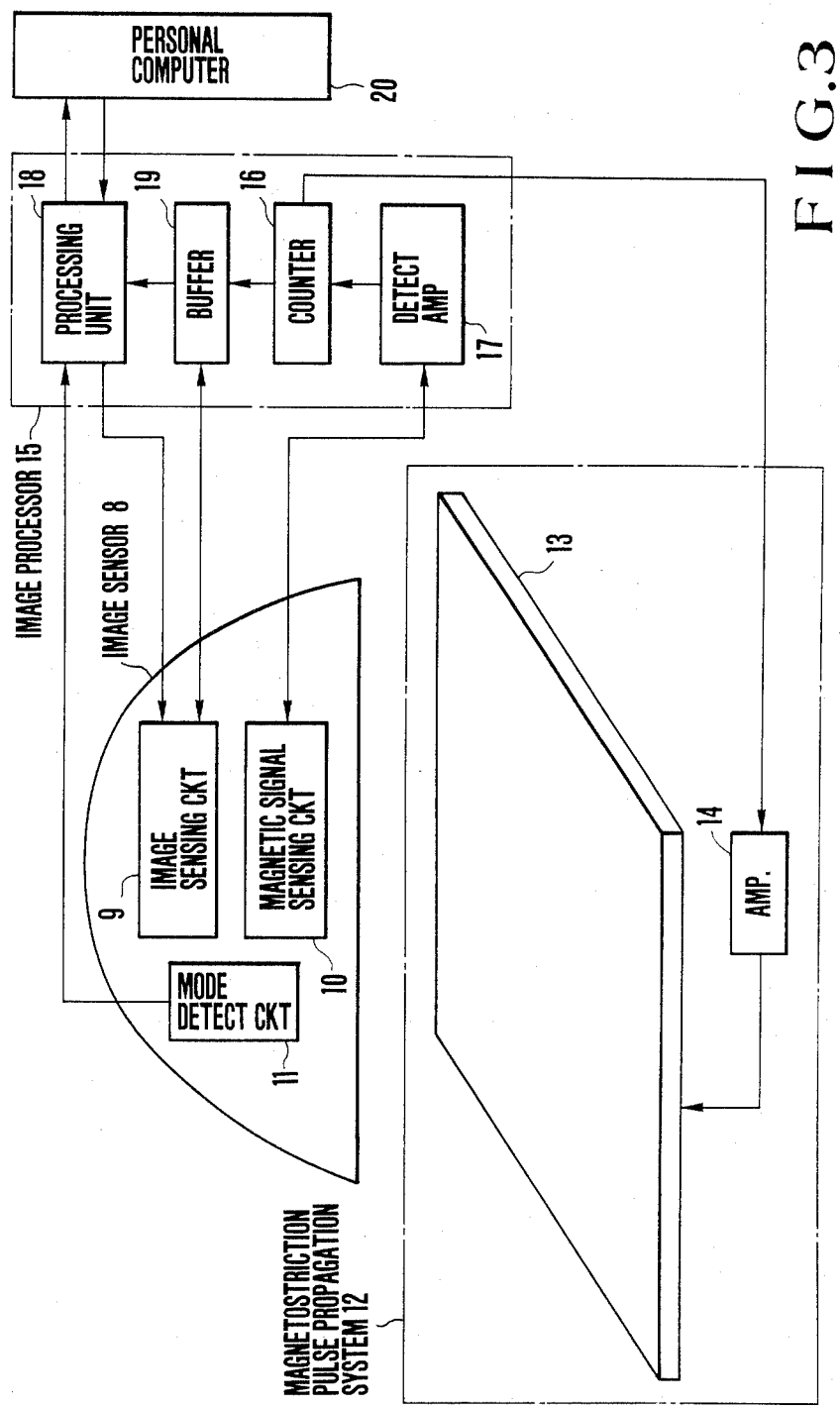
FIG. 3 is a block diagram, in a conceptual manner, illustrating three main parts of the manual image scanning system according to the present invention and reception and transmission of signals effected between functions included in the system.

FIG. 3 is a functional block diagram showing respective parts of the manual image scanning system according to the present invention. The manual image scanner referred to as 8 includes a one-dimensional charge coupled image sensing circuit 9, a magnetic signal sensing circuit 10, and a mode detecting circuit 11 for detecting conditions of the switch 4 and the three functional keys 1, 2 and 3. A magnetostriction pulse propagation system referred to as 12 comprises a position detecting tablet 13, and an amplifier circuit 14 required for supplying magnetostriction pulses. Further, a high speed image processing circuit referred to as 15 comprises a counter circuit 16 coupled to the input of the amplifier circuit 14, an infinitesimal signal detection circuit 17 coupled to the output of the magnetic signal sensing circuit 10, a high speed signal processing unit 18 having one function to input a command as designated mode information from the mode detection circuit 11 and to output a command to the image sensing circuit 9 and the other function to communicate with a personal computer 20, and a buffer memory circuit 19 coupled to the output of the image sensing circuit 9. The counter circuit 16 is operative to deliver a start pulse to the amplifier circuit 14 when its counting operation is initiated, and its counting operation is stopped by a stop pulse from the infinitesimal signal detection circuit 17. The contents of the counter circuit 16 when the counting operation is stopped are supplied to the buffer memory circuit 19. In addition to temporary storage of the contents of the counter circuit 16, the buffer memory circuit 19 is further operative to temporarily store binary image sequence comprising white and black pixel information supplied from the one-dimensional charge coupled image sensor circuit 9. The high speed signal processing unit 18 is operative to execute intelligent image processing referred to later in accordance with a command from the mode detecting circuit 11 to output perfectly processed data to the personal computer 20.

Figure 4:
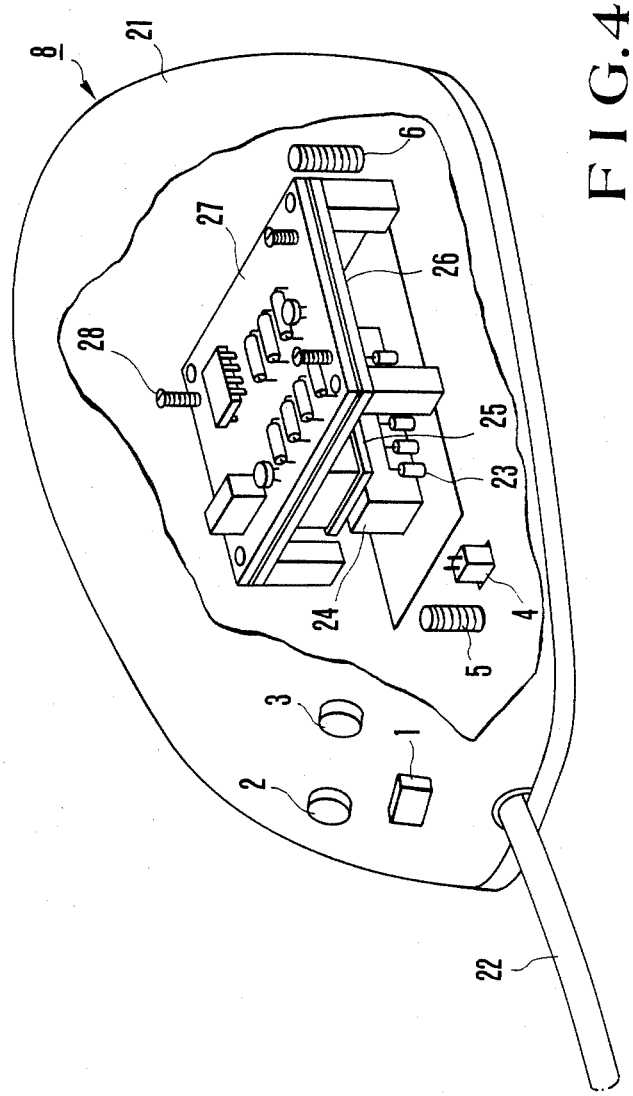
FIG. 4 is a perspective view, partly exploded, illustrating the manual image scanner which is the first main part in the system shown in FIG. 3.

FIG. 4 is a perspective view illustrating the detailed configuration of the above-mentioned manual image scanner 8. On the upper surface of a covering case designated at 21 of the manual image scanner, there are provided functional keys. The function key 1 is used for initially setting, in an arbitrary manner, a coordinate axis of the position detection tablet 13 into the screen coordinate system of the monitor of the personal computer 20. The function key 2 is used for controlling enlargement/reduction ratio of figures drawn on the monitor of the personal computer 20. The function key 3 is used for switching draw-mode, e.g., erase, "OR" draw, or "AND" draw etc. The switch 4 is configured so as to be turned on when the manual image scanner 8 is pushed down on the position detecting tablet 13, and turned off when a depression force is removed. When the switch 4 is in on-state, the high speed signal processing unit 18 initiates processing to effect picture drawing operation. In contrast, when in off-state, it stops program execution. The magnetic coil members 5 and 6 function as magnetoelectric transducers which comprise columnar cores of ferrite material and coils wound thereon, respectively. Each transducer is operative to detect the strength of a magnetic field which changes in response to magnetostriction pulses propagating through the position detecting tablet 13 to convert it into an electric signal. The electric signal is supplied to the amplifier circuit 17 of the high speed image processing circuit 15 via a cord 22. As an optical system, there are provided a LED lamp array 23 for irradiating light onto the paper and convergent optical transmitting element 24 commercially known as SELFOC lens. For reading an image pattern, there is further provided a one-dimensional charge coupled sensor device 25. These members 23, 24 and 25 are provided on the back of a height adjustment plate 26. On the surface of the height adjustment plate 26, there is provided a binary coding circuit board operative to sample analog image signals from the one-dimensional charge coupled sensor device 25 and convert them into a binary form. A threshold value in the binary coding can be arbitrarily set by the personal computer 20. Further, screws 28 are provided in association with the height adjustment plate 26 to adjust the height adjustment plate 26.

Figure 5:
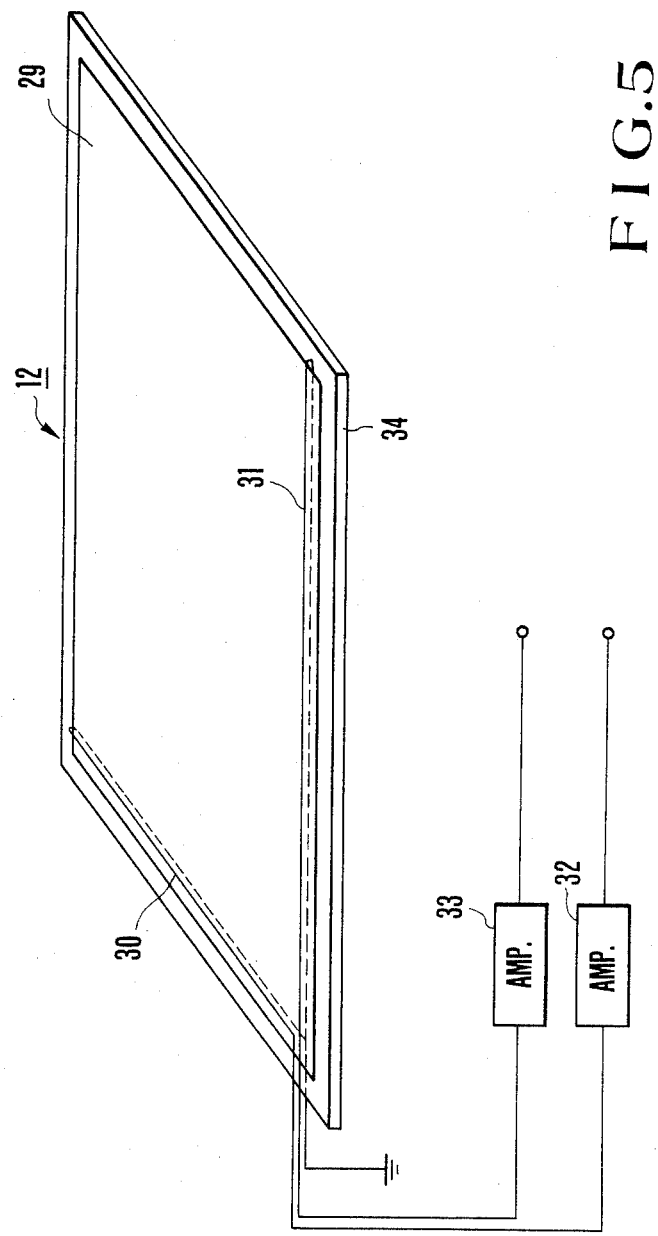
FIG. 5 is a perspective view illustrating a magnetostriction pulse propagation system for a position sensing which is the second main part in the system shown in FIG. 3.

Referring to FIG. 5, there is shown the magetostriction pulse propagation system 12. The system 12 comprises a nickel plate 29, one-turn coils 30 and 31 for generating magnetostriction pulses in X- and Y-axes, respectively, amplifiers 32 and 33 for supplying a high voltage impulse to the one-turn coils 30 and 31, and a magnetic plate 34 is made of ferromagnetic material, e.g., barium ferrite or strontium ferrite and permanently magnetized. The magnetic plate 34 is magnetized in a manner that a line of magnetic force is directed in parallel with the surface of the magnetic plate and in a diagonal direction. For this reason, the nickel plate 29 placed on the magnetic plate 34 can permanently retain magnetization in a direction along the line of magnetic force. Accordingly, magnetostriction pulses produced from the one-turn coils 30 and 31 propagate without reduction over the entire surface of the nickel plate, thus always guaranteeing stable coordinate detection.

Figure 6:
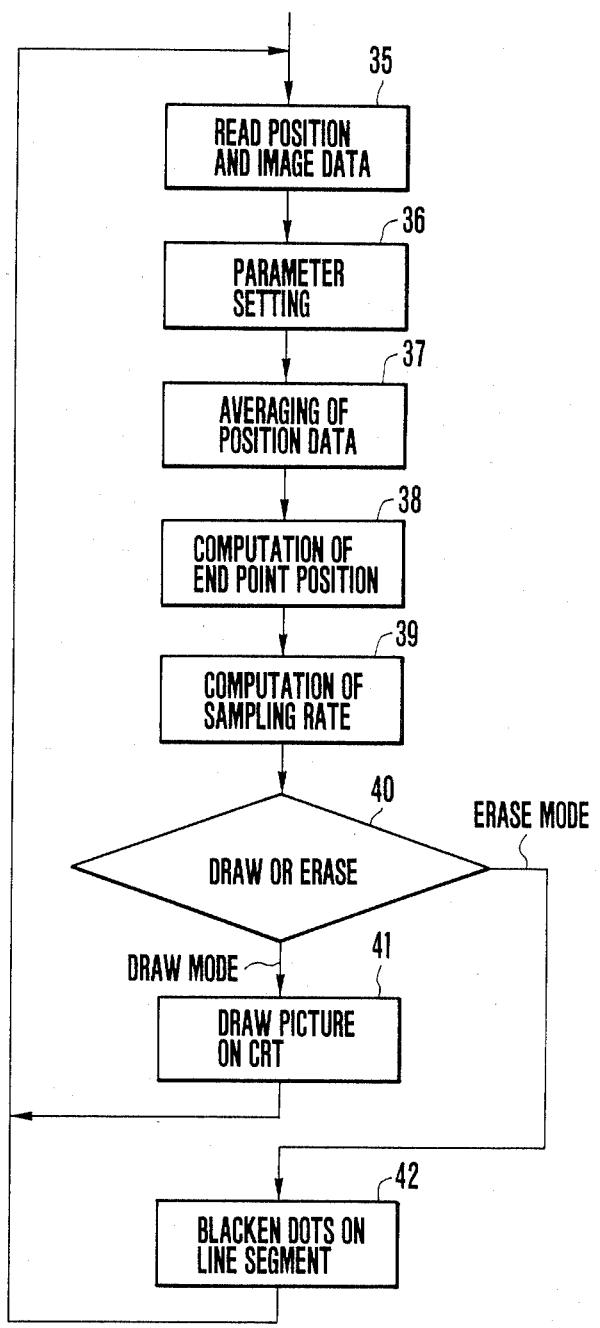
FIG. 6 is a flow chart showing processing steps executed in a high speed image processing circuit which is the third main part in the system shown in FIG. 3.
Figure 7:
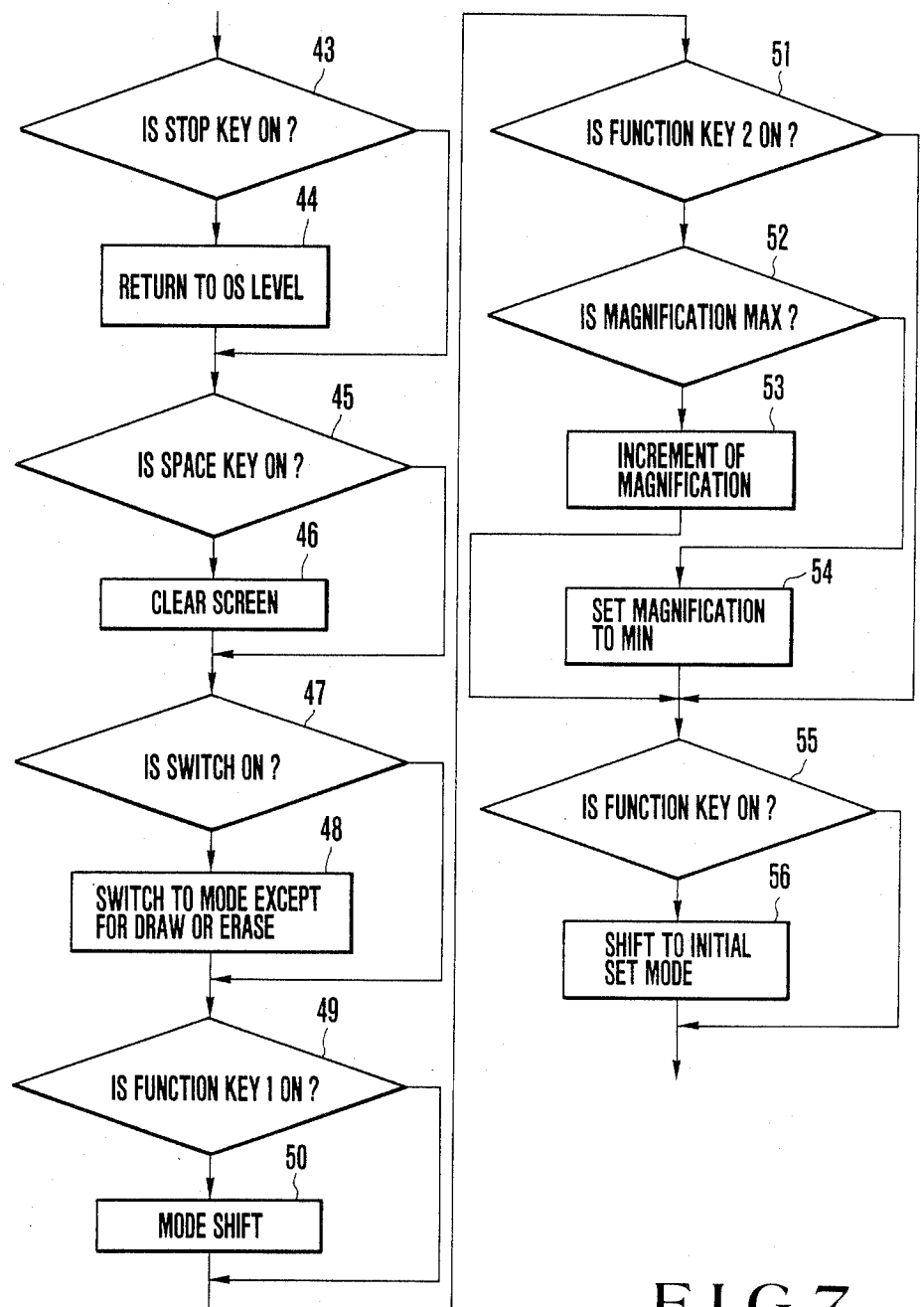
FIG. 7 is a flow chart showing details of a function box for setting parameters shown in FIG. 6.

FIGS. 6 and 7 are flow charts schematically showing an image processing program stored in the high speed processing unit 18. Function boxes shown in these flow charts will be described below.

In the step 35, the image processing unit 18 initially becomes operative to read, into its internal memory, position data from the image sensor coils 5 and 6 and image data detected by the one-dimensional charge coupled sensor device 25 stored in the buffer memory circuit 19. In the step 36, the setting of various kinds of parameters is carried out, which is detailed in FIG. 7 as will be referred to later. In the step 37, a plurality of sensed position data from the image sensor coils 5 and 6 are averaged to reduce a sensing error of the position data. In the step 38, a computation of positions of opposite end points of the one-dimensional charge coupled device 25 on the screen coordinate system of the personal computer is made with reference to an enlargement and reduction ratio. In the step 39, a computation of the least number of dots required for drawing a picture image on a line segment connecting the opposite end points computed in the step 38 is made to compute a sampling rate of the image data read from the one-dimensional charge coupled device 25. In the step 40, a judgement as to whether the present mode is a picture-draw mode or a line erase mode is carried out. When the present mode is judged as picture-draw mode, a picture image is drawn on the screen in the step 41. In contrast, when it is judged as a line erase mode, a processing is made such that dots on the line segment connecting the opposite end points are blackened in the step 42.

FIG. 7 shows details of the function box 36 in FIG. 6.

In the step 43, a judgement as to whether a stop key of a key board provided in association with the personal computer 20 is pushed down or not is carried out. When the stop key is pushed down, the program execution returns to the OS (operating system) level of the personal computer 20 in the step 44. In the step 45, a judgement as to whether a space key of the key board is pushed down or not is carried out. When the space key is pushed down, the screen of the CRT monitor of the personal computer 20 is cleared in the step 46. In the step 47, a judgement as to whether the switch 4 is pushed down or not is carried out. When the switch 4 is not pushed down, a processing is made so as to change a mode which does not execute picture-drawing or erase in the step 48. In the step 49, a judgement as to whether the functional key 1 is pushed down or not is carried out. When pushed down, in the step 50, if the present mode is the draw mode, it is switched to the erase mode, while if the present mode is the erase mode, it is switched to the draw mode. In the step 51, a judgement as to whether the functional key 2 is pushed down or not is carried out. When pushed down, a judgement as to whether the present magnification is maximum or not is carried out in the step 52. When judged as maximum, a processing is executed so as to minimize the magnification in the step 53, while when otherwise, a processing is executed so that the magnification is incremented by one step in the step 54. In the step 55, a judgement as to whether the function key 3 is pushed down or not is made. When pushed down, a processing is made so as to switch the draw mode to the initial setting mode of the coordinate system in the step 56.

What is claimed is:

1. A manual image scanning system comprising:
    (a) tablet means in which magnetostriction pulses propagate, said tablet means being adapted so as to place thereon a sheet of paper on which a figure is drawn,
    (b) manual image scanner means adapted to be manually movably placed on said tablet means, said scanner means having a first function to recognize said figure drawn on said paper to produce data indicative of image of said figure, and a second function to sense said magnetostriction pulses for detecting a position of said scanner means to produce data indicative of the position of said scanner means, and
    (c) processor means responsive to said image data and said position data from said manual image scanner means to compute coordinates of said scanner means, thereby recognizing which portion of said tablet means the image data corresponds to.

2. A manual image scanning system as set forth in claim 1, wherein said tablet means is provided with magnetostriction pulse generating means for allowing first and second magnetostrction pulses to propagate in said tablet means in directions different from each other.

3. A manual image scanning system as set forth in claim 2, said magnetostriction pulse generating means comprises two one-turn coils for generating magnetostriction pulses in X- and Y-axes, respectively, a magnetostriction pulse propagation system being constituted by said tablet means and means for applying high voltage impulses to said one-turn coils.

4. A manual image scanning system as set forth in claim 3, wherein said tablet means comprises a magnetrostriction metal plate in which a magnetostriction wave based on said magnetostriction phenomenon propagates, and a magnetic plate provided on one side of said magnetostriction metal plate, said magnetic plate being magnetized so as to allow said magnetostriction plate to be magnetized in a direction parallel to the plate surface thereof.

5. A manual image scanning system as set forth in claim 2, wherein said tablet means comprises a magnetostriction metal plate in which a magnetostriction wave based on said magnetostriction phenomenon propagates, and a magnetic plate provided on one side of said magnetostriction metal plate, said magnetic plate being magnetized so as to allow said magnetostriction plate to be magnetized in a direction parallel to the plate surface thereof.

6. A manual image scanning system as set forth in claim 1, wherein said manual image scanner means comprises optical figure or letter recognition means for performing said first function, and magnetic detection means for performing said second function.

7. A manual image scanning system as set forth in claim 6, wherein said manual image scanner means is provided on the upper surface thereof with a plurality of function keys for allowing said processor means to effect predetermined image processings.

8. A manual image scanning system as set forth in claim 6, wherein said manual image scanner means is provided on the back side thereof with a switch for a figure recognition operation, a pair of magnetic signal sensing coils, and a window opened through the bottom portion for reading the image of said letter drawn on said paper.

9. A manual image scanning system as set forth in claim 6, wherein said optical figure or letter recognition means includes an image sensing circuit, said magnetic detector means includes a magnetic signal sensing circuit, and said switch is coupled to a mode detection circuit.

10. A manual image scanning system as set forth in claim 6, wherein said manual image scanner means further comprises a LED lamp array for irradiating light onto said paper, an optical lens system, a one-dimensional charge coupled sensor device, a height adjustment plate, and a binary coding circuit board.

11. A manual image scanning system as set forth in claim 1, wherein said processor means comprises a counter circuit, an infinitesimal signal detection circuit responsive to an output from said magnetic signal sensing circuit, a buffer memory circuit responsive to an output from said image sensing circuit, and a processing unit responsive to an output from said mode detection circuit and an output from said buffer memory circuit, said processing unit being operative to provide a command to said image sensing circuit and to transmit image processing data to an external computer or receive it therefrom.

12. A manual image scanning system as set forth in claim 1, wherein said tablet means comprises a magnetostriction metal plate in which a magnetostriction wave based on said magnetostriction phenomenon propagates, and a magnetic plate provided on one said of said magnetostriction metal plate, said magnetic plate being magnetized so as to allow said magnetostriction plate to be magnetized in a direction parallel to the plate surface thereof.

13. A manual image scanning system as set forth in claim 12, 5 or 4, wherein said metal plate is comprised of a nickel plate.

* * * * *